US012362640B2

(12) United States Patent
Ochiai et al.

(10) Patent No.: US 12,362,640 B2
(45) Date of Patent: Jul. 15, 2025

(54) RESOLVER ATTACHMENT STRUCTURE

(71) Applicant: MINEBEA MITSUMI Inc., Nagano (JP)

(72) Inventors: Takaaki Ochiai, Nagano (JP); Takahiro Beppu, Nagano (JP)

(73) Assignee: MINEBEA MITSUMI INC., Nagano (JP)

(*) Notice: Subject to any disclaimer, the term of this patent is extended or adjusted under 35 U.S.C. 154(b) by 136 days.

(21) Appl. No.: 18/548,282

(22) PCT Filed: Mar. 14, 2022

(86) PCT No.: PCT/JP2022/011238
§ 371 (c)(1),
(2) Date: Aug. 29, 2023

(87) PCT Pub. No.: WO2022/230396
PCT Pub. Date: Nov. 3, 2022

(65) Prior Publication Data
US 2024/0146168 A1 May 2, 2024

(30) Foreign Application Priority Data
Apr. 30, 2021 (JP) ................. 2021-077251

(51) Int. Cl.
*H02K 24/00* (2006.01)
*H02K 11/225* (2016.01)
(52) U.S. Cl.
CPC .......... *H02K 24/00* (2013.01); *H02K 11/225* (2016.01)
(58) Field of Classification Search
CPC .............. H02K 11/225; H02K 24/00
(Continued)

(56) References Cited

U.S. PATENT DOCUMENTS

2013/0099609 A1* 4/2013 Ikeno ............... H02K 29/08
310/68 B
2014/0354094 A1* 12/2014 Yazaki ............... H02K 3/28
310/71

(Continued)

FOREIGN PATENT DOCUMENTS

JP 2013-027123 A 2/2013
JP 2015-034703 A 2/2015
JP 6246967 B1 12/2017

OTHER PUBLICATIONS

International Search Report for corresponding International Application No. PCT/JP2022/011238 mailed May 17, 2022.

(Continued)

*Primary Examiner* — Rashad H Johnson
(74) *Attorney, Agent, or Firm* — Chrisman Gallo Tochtrop LLC (57) ABSTRACT

A stator includes a stator core, a stator winding wound via an insulator provided at the stator core, and a terminal block arranged at an outer side in a direction of the stator core. The stator core includes an end portion protruding from an opening of a housing in an axial direction and is mounted to the housing by a mounting bracket being in contact with an end face of the end portion. The mounting bracket includes an annular portion having a C-shape, a connecting portion disposed between both ends of the annular portion, and a bent portion protruding upward in the axial direction at an inner circumferential edge portion of the annular portion. The bent portion is in contact with the end face of the stator core. The connecting portion includes a relief portion extending at a position away from the terminal block.

10 Claims, 9 Drawing Sheets

(58) Field of Classification Search
USPC .................................................. 310/68 B, 89
See application file for complete search history.

(56) References Cited

U.S. PATENT DOCUMENTS

| | | | |
|---|---|---|---|
| 2015/0042322 A1 | 2/2015 | Otobe et al. | |
| 2015/0076940 A1* | 3/2015 | Ohashi ..................... | H02K 5/04 310/58 |
| 2015/0188376 A1* | 7/2015 | Yamaguchi ............. | H02K 3/28 310/71 |
| 2016/0013697 A1* | 1/2016 | Haga ........................ | H02K 5/08 310/71 |
| 2016/0118853 A1* | 4/2016 | Nishikawa ............. | H02K 3/522 310/43 |
| 2018/0097421 A1* | 4/2018 | Abe ......................... | H02K 3/32 |
| 2018/0233984 A1* | 8/2018 | Ogawa .................... | H02K 5/1732 |
| 2018/0248438 A1* | 8/2018 | Ogawa .................... | H02K 5/161 |
| 2018/0316235 A1* | 11/2018 | Yamada .................. | H02K 15/10 |
| 2018/0323691 A1* | 11/2018 | Nakano .................. | H02K 1/146 |
| 2019/0036412 A1* | 1/2019 | Harada ................... | H02K 5/1672 |
| 2019/0252941 A1* | 8/2019 | Onishi .................... | H02K 15/14 |
| 2019/0296601 A1* | 9/2019 | Yamaguchi ............. | H02K 5/225 |
| 2019/0305614 A1* | 10/2019 | Ikura ....................... | H02K 1/185 |
| 2019/0386535 A1* | 12/2019 | Shiraishi ................ | H02K 3/522 |
| 2020/0059127 A1* | 2/2020 | Yamashita ............. | H02K 3/522 |
| 2020/0059129 A1* | 2/2020 | Yamashita ............. | H02K 3/522 |
| 2020/0153302 A1* | 5/2020 | Yoshida .................. | H02K 3/38 |
| 2020/0244151 A1* | 7/2020 | Kaneta ................... | H02K 11/21 |
| 2022/0037967 A1* | 2/2022 | Yamaguchi ............ | H02K 11/33 |
| 2022/0069666 A1* | 3/2022 | Shiraki ................... | H02K 3/52 |
| 2023/0064806 A1* | 3/2023 | Tabuchi ................. | H02K 5/225 |
| 2023/0101842 A1* | 3/2023 | Okamoto ............... | H02K 7/085 310/66 |
| 2023/0126488 A1* | 4/2023 | Hattori ................... | H02K 3/522 310/71 |
| 2023/0283137 A1* | 9/2023 | Takahashi ............. | H02K 1/2792 310/208 |
| 2024/0063678 A1* | 2/2024 | Kang ...................... | H02K 1/16 |
| 2025/0112527 A1* | 4/2025 | Takahashi ............. | H02K 5/225 |

OTHER PUBLICATIONS

Written Opinion for corresponding International Application No. PCT/JP2022/011238 mailed May 17, 2022.
English translation of Written Opinion for corresponding International Application No. PCT/JP2022/011238 dated May 17, 2022.

* cited by examiner

RESOLVER ATTACHMENT STRUCTURE

CROSS REFERENCE TO RELATED APPLICATIONS

This application is a continuation of International Application No. PCT/JP2022/011238, filed on Mar. 14, 2022, which claims priority to Japanese Patent Application 2021-077251, filed on Apr. 30, 2021, which is incorporated herein by reference.

TECHNICAL FIELD

The disclosure relates to a structure for mounting a resolver to a housing, and more particularly to a technique for suppressing deformation of a mounting member.

BACKGROUND

Resolvers are conventionally known as means for detecting a rotation angle of a motor or the like. A resolver includes a rotor fixed to a rotation shaft of a motor or the like to rotate together with the rotation shaft, and a stator fixed to a housing and arranged outside the rotor. When the rotor rotates, a dimension of an air gap formed between the rotor and the stator changes with the rotation of the rotor, an output corresponding to this change is generated at a detection coil arranged at a stator side, and a rotation angle of the rotor is detected based on the output.

Figure 13:
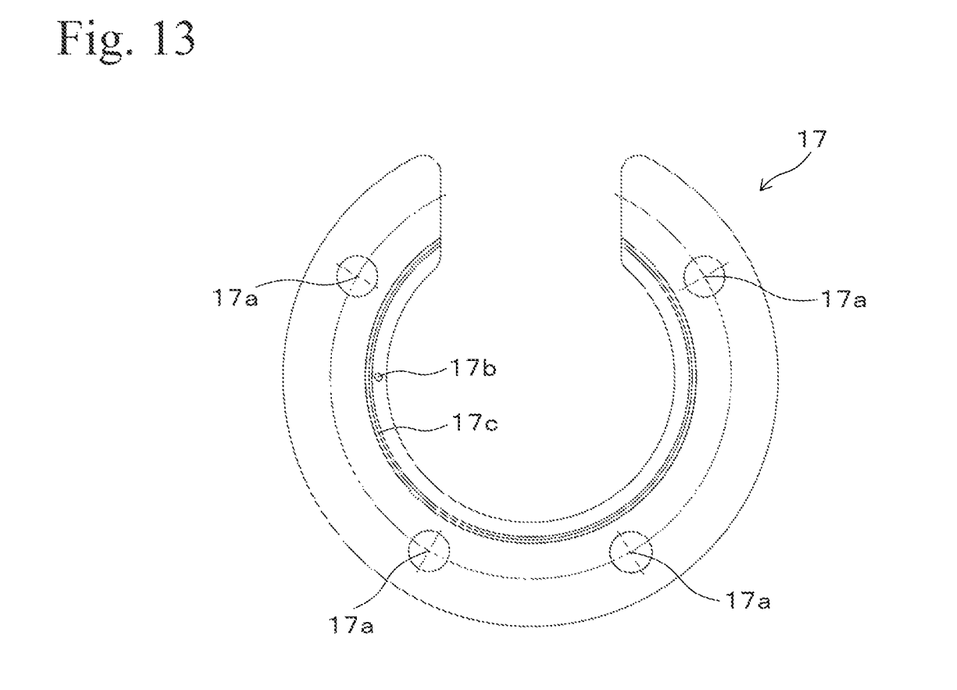
FIG. 13 is a plan view illustrating a conventional mounting member disclosed in JP 2015-34703 A.

As a structure for fixing a resolver at a mounting target object, there has been proposed a structure for accommodating a stator of a resolver in an opening of a housing and mounting the stator at the housing with a mounting bracket (see, for example, JP 2015-34703 A). Referring to FIG. 13 reproducing FIG. 7 of JP 2015-34703 A, a mounting bracket 17 has a C-shape formed by cutting out a part of an annular portion, includes a plurality of bolt insertion holes 17a for inserting bolts 14 in a circumferential direction, and is provided with a portion 17c curved in an axial direction along an inner circumferential edge, thereby being structured to press a stator 3 against the housing.

SUMMARY

The mounting bracket 17 having a C-shape described in JP 2015-34703 A is manufactured by stamping a plate made of a metal material, as described at paragraph 0025 in JP 2015-34703 A. However, if the plate thickness of the mounting bracket 17 is thin, the mounting bracket 17 may be deformed when being held by hand because the mounting bracket 17 has a C-shape formed by cutting out a part of the annular portion. When the mounting bracket 17 is deformed, a relative position between the mounting bracket 17 and the stator 3 is shifted or the positions of the bolt insertion holes 17a are shifted, causing a problem such as occurrence of a failure upon insertion of the bolts 14.

The disclosure has been made in view of the above-described circumstances, and an object of the disclosure is to provide a structure for mounting a resolver for making a mounting bracket less likely to deform in a structure for mounting a resolver to a housing.

The disclosure is a structure for mounting a stator of a resolver, the structure being for mounting the stator of the resolver at an opening of a housing. The stator includes a stator core, a stator winding wound around the stator core via an insulator provided at the stator core, and a terminal block disposed at an outer side of the stator core in a radial direction. The stator core includes an end portion at one side in an axial direction, the end portion protruding from the opening of the housing in the axial direction, and is mounted to the housing by a mounting member being in contact with an end face of the end portion. The mounting member includes an annular portion extending in a range excluding a part of an entire circumference, a connecting portion disposed between both ends of the annular portion, and a bent portion protruding toward the one side in the axial direction at an inner circumferential edge portion of the annular portion. The bent portion is in contact with the end face of the stator core. The connecting portion includes a relief portion extending at a position away from the terminal block.

In the structure for mounting a stator of a resolver having the configuration described above, since the annular portion of the mounting member and the relief portion are continuous while contact between the mounting member and the terminal block is avoided by the relief portion, resistance to deformation is strong even if the plate thickness of the mounting member is thin. Therefore, even when the mounting member is held by hand and operated, the mounting member is less likely to be deformed.

According to the disclosure, since the mounting member is structured to be less likely to be deformed even when held by hand, it is possible to accurately align relative positions of the mounting member and the stator and positions of bolt insertion holes.

DESCRIPTION OF EMBODIMENTS

[1] First Embodiment

1. Configuration of Resolver

Figure 1:
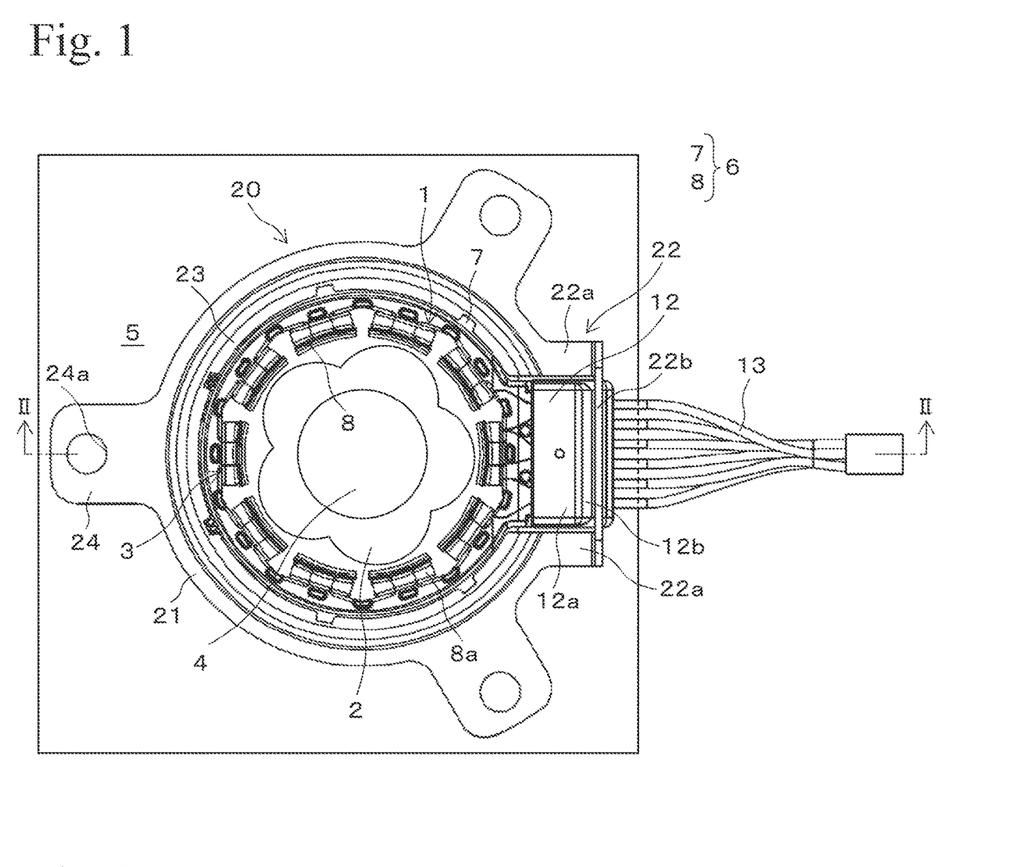
FIG. 1 is a plan view illustrating a state of a mounting member attached to a stator of a VR-type resolver according to a first embodiment of the disclosure.

FIG. 1 illustrates a resolver 1 according to a first embodiment of the disclosure as viewed from an axial direction. The resolver 1 is a VR (variable reluctance) type resolver. The resolver 1 includes a rotor 2 and a stator 3. The rotor 2 is fixed to an output shaft 4 of a motor (not illustrated). When viewed from the axial direction, the rotor 2 has a non-circular shape including a plurality of projections projecting outward in a radial direction. The rotor 2 has a structure obtained by stacking a plurality of thin plate-like rotor cores in the axial direction.

The thin plate-like rotor cores constituting the rotor 2 are manufactured by stamping a plate made of a magnetic steel sheet into a shape illustrated in the drawing. The plurality of rotor cores are stacked in the axial direction and fixed by crimping to form the rotor 2. The stator 3 is arranged at an outer side of the rotor 2 and is fixed to a housing 5. A gap is provided between the rotor 2 and the stator 3 so that the rotor 2 is structured to be able to rotate at an inner side of the stator 3. The housing 5 is a member to be mounted with the resolver 1, and is provided with a screw hole 5d for fixing the resolver 1 (see FIG. 3). The screw hole 5d has an internal thread formed at an inner circumference, and is structured to be screwed with a bolt 14.

The stator 3 includes a stator core 6. The stator core 6 has a structure obtained by stacking a plurality of thin plate-like cores in the axial direction. The thin plate-like cores are shaped to include a core back 7 having an annular shape and a plurality of teeth 8 protruding inward in the radial direction from the core back 7. The core is manufactured by stamping a plate made of a magnetic steel sheet. A plurality of the cores are stacked in the axial direction and fixed by crimping to obtain the stator core 6.

Figure 2:
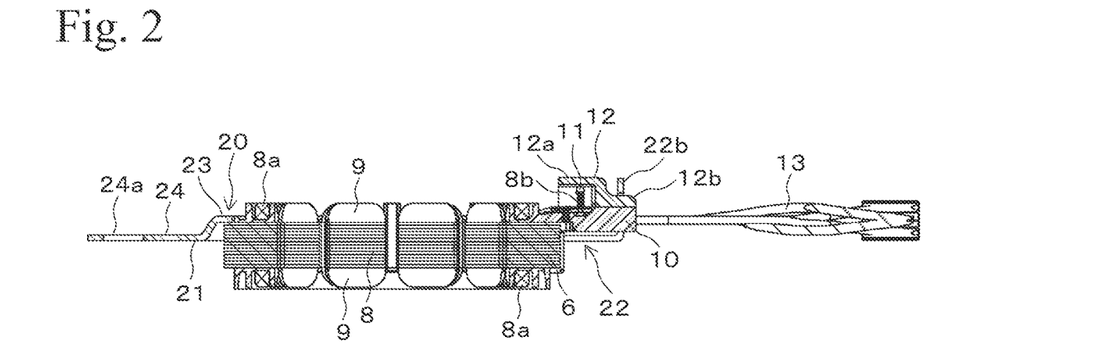
FIG. 2 is a cross-sectional view taken along line II-II in FIG. 1.

As illustrated in FIG. 2, a pair of insulators 9 are attached from both sides of the stator core 6 in the axial direction. The insulators 9 are made of resin, and a stator winding 8a is wound around each of the teeth 8 via the insulators 9. The stator winding 8a includes an excitation winding and an output winding. The output winding includes a sin-phase winding for outputting a sin signal and a cos-phase winding for outputting a cos signal having a phase different from the phase of the sin signal by 90°. A winding end 8b of each of the excitation winding and the output winding is tied around one end of a terminal pin 11 embedded in a terminal block 10 integrally formed with the insulators 9, and is electrically connected to the terminal pin 11. Note that, in FIG. 1, the reference sign 13 denotes a lead wire, and the lead wire 13 is connected to the other end of each terminal pin 11. Note that the stator core 6 may be formed as an insert material integrally with the insulators 9 and the terminal block 10 by resin injection molding.

A terminal cover 12 is attached to the terminal block 10. The terminal cover 12 includes a main body portion 12a having a box shape and covering an upper side, left and right sides, and a rear side (the right side in FIG. 2) of the terminal pin 11 and a tail portion 12b formed to be thinner than the main body portion 12a. The terminal cover 12 protects the terminal pins 11 and the like by particularly preventing contact with other components at an upper side.

2. Configuration of Structure for Mounting Resolver

Figure 3:
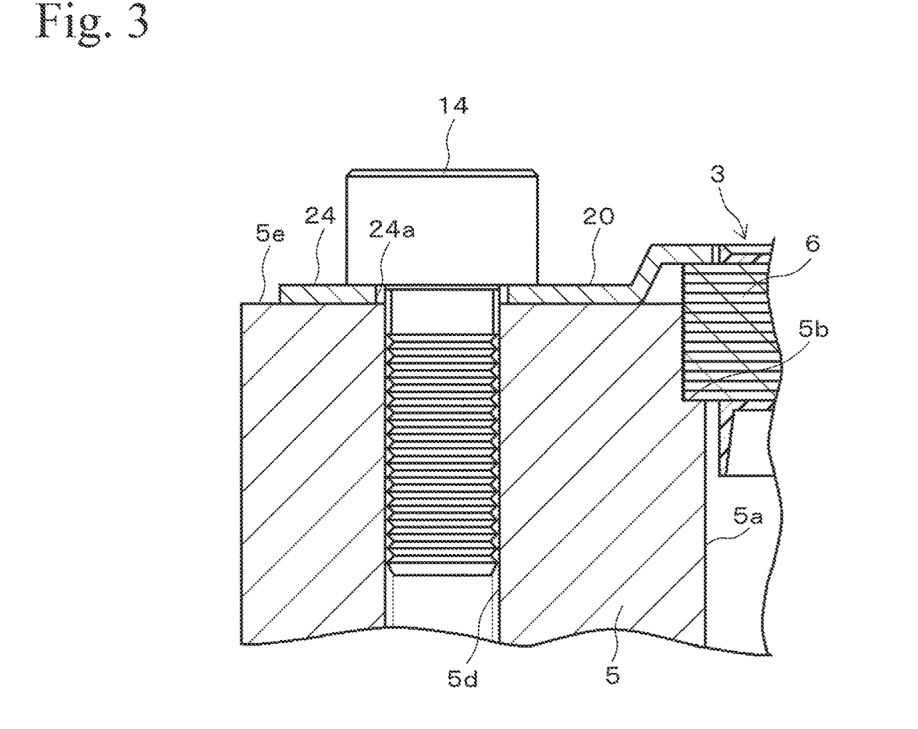
FIG. 3 is a cross-sectional view illustrating a state of the mounting member illustrated in FIG. 1 attached to a housing.

A structure for fixing the resolver 1 at the housing 5 will be described below. First, as illustrated in FIG. 3, an opening 5a for accommodating the resolver 1 is formed at the housing 5. The opening 5a is a substantially circular when viewed in the axial direction, and has a cylindrical hollow shape.

When the stator 3 is accommodated at the opening 5a, an outer circumferential surface of the stator core 6 (see FIG. 2) is fitted to an inner circumferential surface of the opening 5a. In this state, an edge portion of an end portion of the stator core 6 in the axial direction is in contact with a step portion 5b provided at the inner circumferential surface of the opening 5a, whereby the position of the stator 3 (stator core 6) with respect to the housing 5 in the axial direction is determined. When the stator 3 is accommodated at the opening 5a of the housing 5, an upper end face of the stator core 6 protrudes from the opening 5a. The stator core 6 is pressed against and fixed to the housing 5 by a mounting bracket (mounting member) 20.

Figure 4:
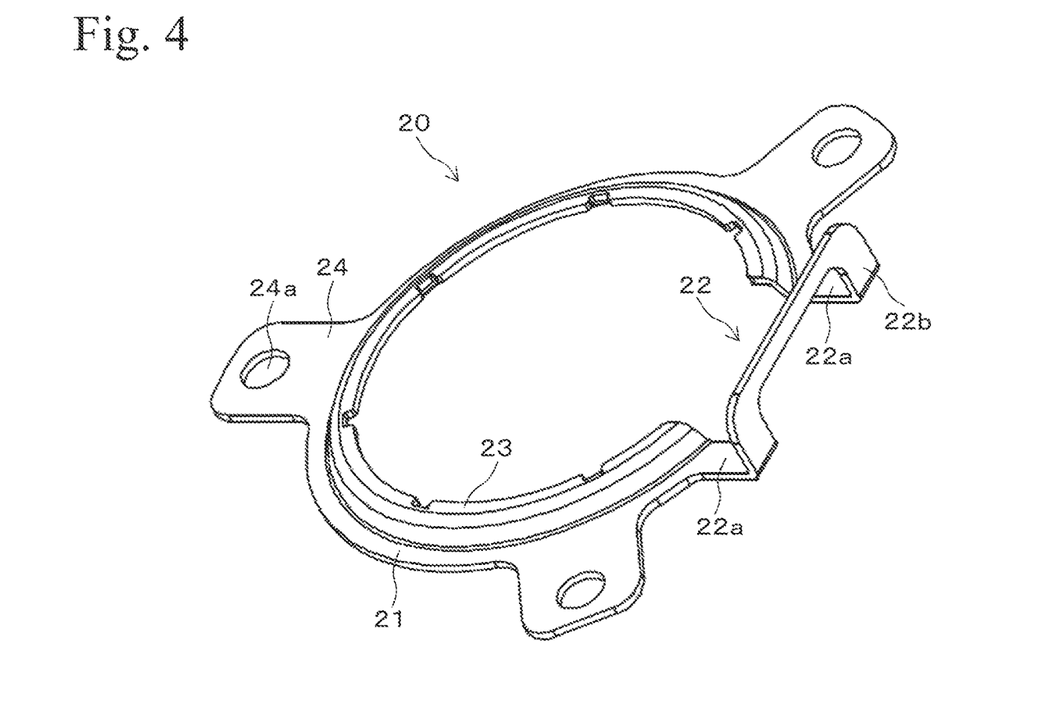
FIG. 4 is a perspective view illustrating the mounting member illustrated in FIG. 1.
Figure 5:
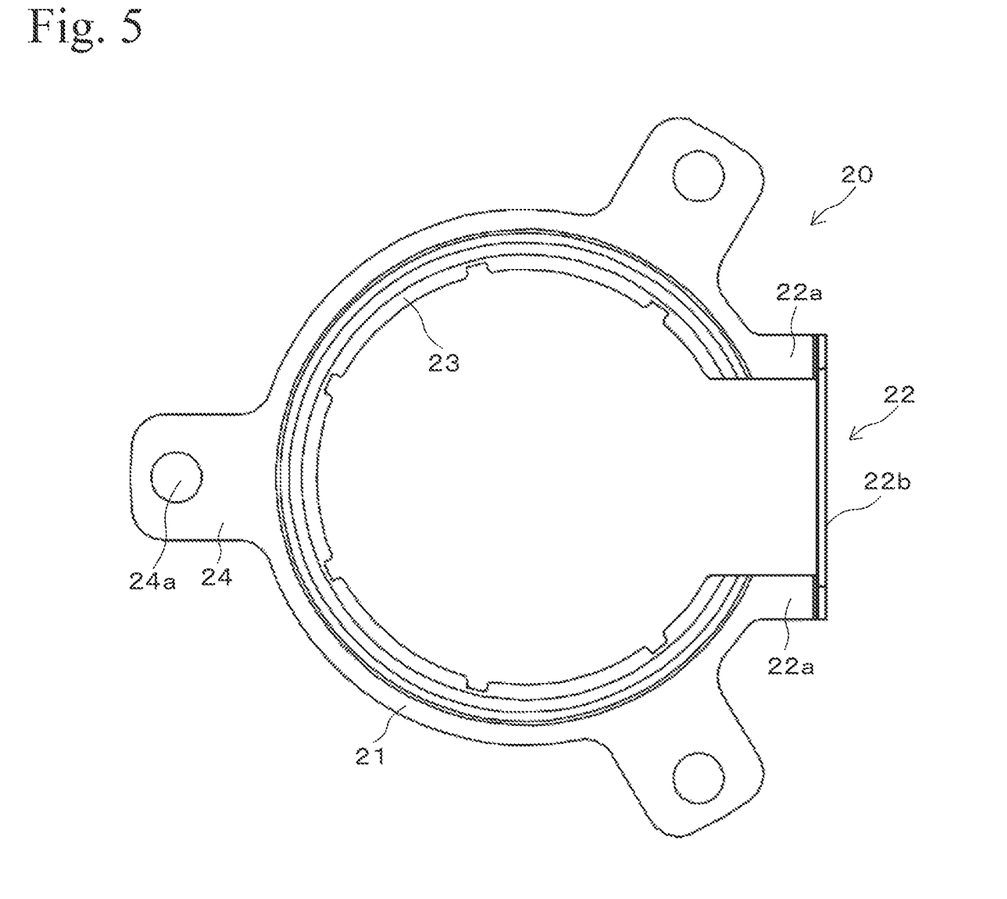
FIG. 5 is a plan view of the mounting member illustrated in FIG. 4.

As illustrated in FIG. 4 and FIG. 5, the mounting bracket 20 has an annular shape and is manufactured by stamping a plate made of a metal material. The metal material is preferably a non-magnetic metal material (for example, a non-magnetic stainless steel plate), but may be a magnetic metal material (for example, a cold-rolled steel plate) as long as the characteristics of the resolver are not greatly affected. The mounting bracket 20 includes an annular portion 21 having a substantially C-shape and a connecting portion 22 disposed between both ends of the annular portion 21. The connecting portion 22 includes arm portions 22a protruding outward in the radial direction from both ends of the annular portion 21, and a relief portion 22b bent at right angles at leading ends of the arm portions 22a to form a gate shape. A center part of the relief portion 22b is arranged above the tail portion 12b of the terminal cover 12 and is not in contact with the tail portion 12b. Note that the angle between the relief portion 22b and the arm portions 22a is not limited to 90°, but may be any angle as long as contact with the terminal cover 12 can be avoided.

Figure 6:
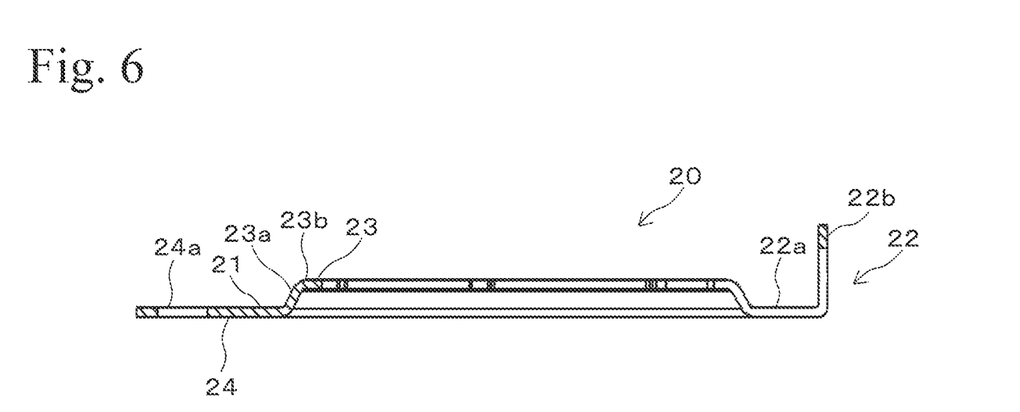
FIG. 6 is a cross-sectional view of the mounting member illustrated in FIG. 5.
Figure 7:
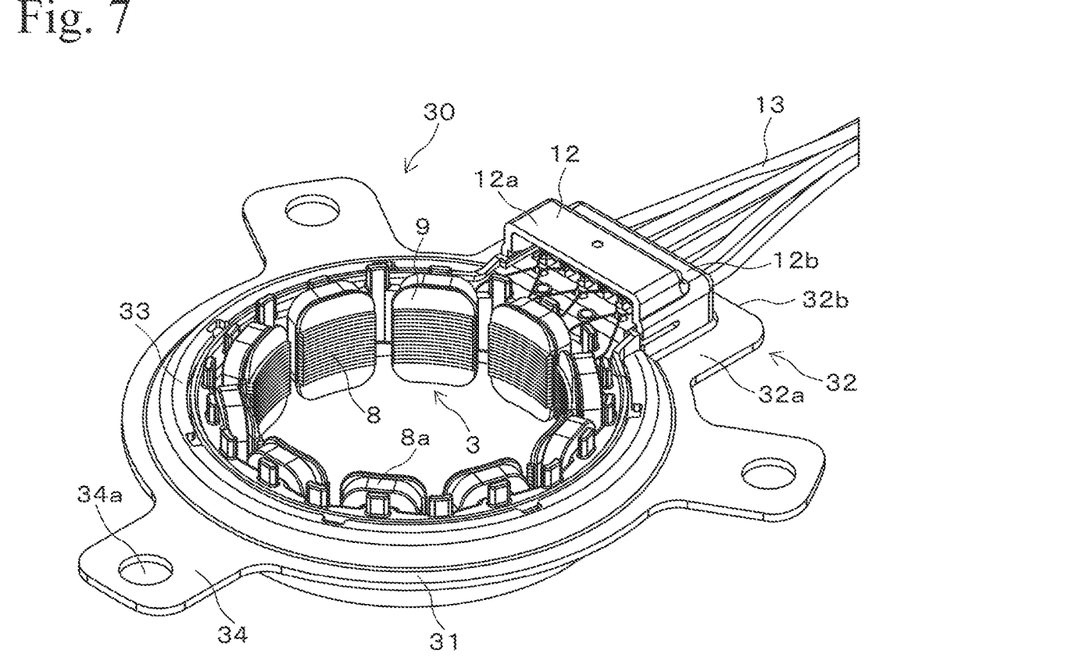
FIG. 7 is a perspective view illustrating a state of a mounting member attached to a stator of a VR-type resolver according to a second embodiment of the disclosure.
Figure 8:
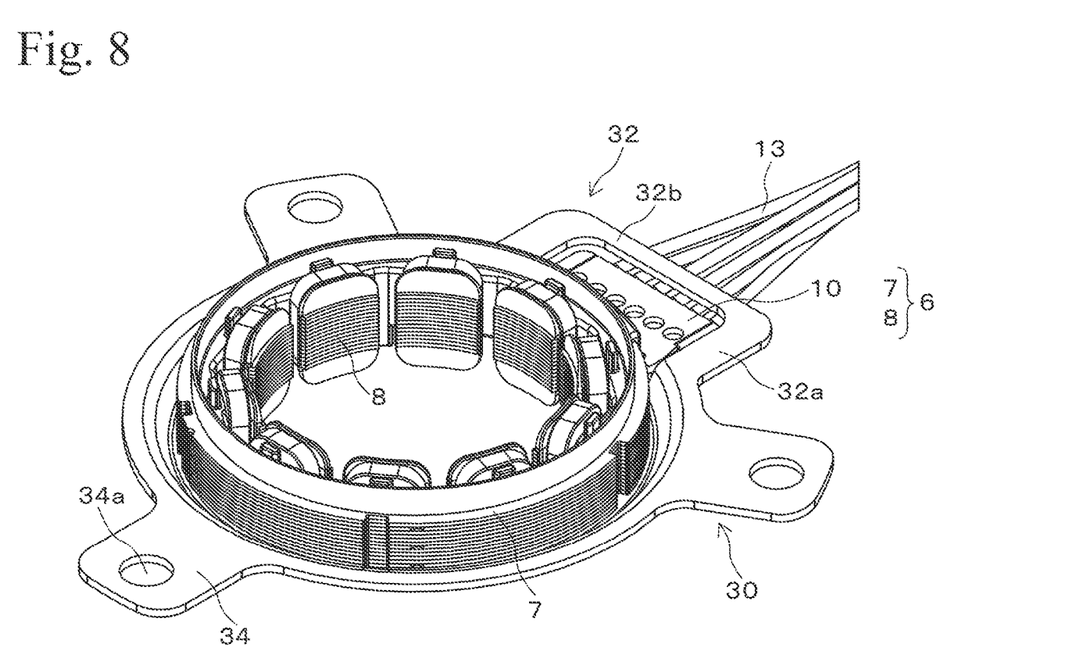
FIG. 8 is a perspective view illustrating FIG. 7 upside down.
Figure 9:
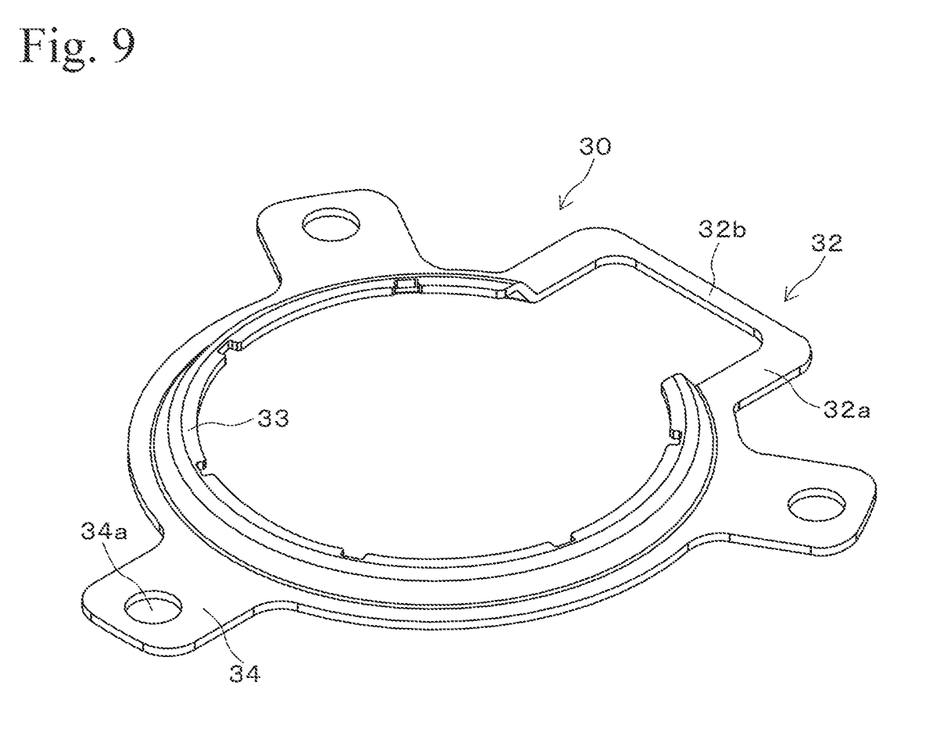
FIG. 9 is a perspective view illustrating the mounting member illustrated in FIG. 7.

A bent portion 23 shifted upward in the axial direction is formed at an inner circumferential edge portion of the annular portion 21. As illustrated in FIG. 6, the bent portion 23 includes a tapered portion 23a rising from the annular portion 21 in a tapered shape, and a planar portion 23b parallel to the annular portion 21. A plurality of (three in this example) flange portions 24 protruding outward in the radial direction are formed at the outer circumferential edge of the annular portion 21 at equal intervals in a circumferential direction. Bolt insertion holes 24a for inserting the bolts 14 (see FIG. 3) are formed at the flange portions 24. Here, the bolt insertion holes 24a may be elongated holes or holes having a diameter larger than the diameter of the thread portion of the bolt 14 so that errors in the position of the screw hole 5d (see FIG. 3) can be absorbed. Note that since the arrangement of the bolt insertion holes 24a coincides with the arrangement of the screw holes 5d, the number and the arrangement of the flange portions 24 are not limited to three.

When the stator 3 is accommodated at the opening 5a of the housing 5 (in the state illustrated in FIG. 3), the mounting bracket 20 is pressed against an attaching surface 5e of the housing 5 from above in the axial direction, and furthermore the bolts 14 are screwed into the screw holes 5d through the bolt insertion holes 24a and the bolts 14 are tightened, whereby the stator 3 is pressed against and fixed to the housing 5 by the mounting bracket 20.

When the stator 3 is fixed at the opening 5a of the housing 5, an end face of the stator core 6 in the axial direction protrudes from the attaching surface 5e of the housing 5. The dimension from a lower surface of the planar portion 23b of the bent portion 23 of the mounting bracket 20 to the attaching surface 5e of the housing 5 is set to be slightly shorter than the protruding dimension of the end face of stator core 6 in the axial direction, and the end face of the stator core 6 protruding from the attaching surface 5e is pressed down by the planar portion 23b in the axial direction. According to this structure, axial play of the stator core 6 does not occur.

When the mounting bracket 20 is attached to the housing 5, the arm portions 22a of the mounting bracket 20 are arranged at both sides of the terminal block 10, and the center of the relief portion 22b is arranged above the tail portion 12b of the terminal cover 12. In this way, the mounting bracket 20 is structured not to come into contact with the terminal block 10 and the terminal cover 12.

3. Effect

In the structure for mounting a resolver having the configuration described above, since the annular portion 21 of the mounting bracket 20 and the relief portion 22b are continuous while contact between the mounting bracket 20 and the terminal block 10 is avoided by the relief portion 22b, resistance to deformation is strong even when the plate thickness of the mounting bracket 20 is thin. Therefore, the mounting bracket 20 is less likely to be deformed even when the mounting bracket 20 is held by hand and operated, and it is possible to accurately align the relative positions of the mounting bracket 20 and the stator core 6 and the positions of the bolt insertion holes 24a.

In addition, the relief portion 22b is arranged above the terminal cover 12, and thus it is possible to avoid contact with the terminal block 10 and the terminal cover 12 without the mounting bracket 20 extending to an outer side of the terminal block 10 in the radial direction. Accordingly, the configuration can be made compact.

Further, since the relief portion 22b is not located above the stator winding 8a, it is possible to respond to a case of lacking free space above the stator winding 8a (for example, when the rotor of the motor is arranged close to the stator winding 8a).

4. Modification Examples

The disclosure is not limited to the embodiment described above, and various modifications are possible as described below.
i) The flange portions 24 are provided in the above-described embodiment, but the width of the annular portion 21 may be increased and bolt insertion holes may be formed at the annular portion 21.
ii) The relief portion 22b is bent at the leading ends of the arm portions 22a in the above-described embodiment, but the relief portion 22b and the arm portions 22a may be connected by welding. For example, the relief portion 22b may be formed in an L-shape in a side view, and base portions of the relief portion 22b may be spot-welded to the arm portions 22a.
iii) The upper side of the terminal block 10 is entirely covered with the terminal cover 12 in the above-described embodiment, but the terminal cover 10 may cover only the place of the terminal pins 11. Alternatively, the terminal cover 12 may not be attached. In that case, the relief portion 22b is configured to avoid contact with the terminal block 10.
iv) The annular portion 21 of the mounting bracket 20 has a substantially C-shape as viewed in the axial direction in the above-described embodiment, but the outer circumference of the annular portion 21 may have any profile shape. For example, a polygonal shape such as a quadrangular shape and a hexagonal shape, and a shape like the rotor 2 illustrated in FIG. 1 are acceptable.
v) The arm portions 22a may be omitted. In this case, the relief portion 22b rises directly from both ends of the annular portion 21 and is arranged above the main body portion 12a.
vi) The shape of the relief portion 22b is not limited to the gate shape, but may be any shape such as an arch shape.

[2] Second Embodiment

A second embodiment of the disclosure will be described with reference to FIG. 7 to FIG. 10B. In the following description, the same reference signs are assigned to constituent elements equivalent to the constituent elements in the first embodiment, and explanation of such constituent elements will be omitted.

A mounting bracket (mounting member) 30 includes an annular portion 31 having a substantially C-shape and a connecting portion 32 disposed between both ends of the annular portion 31. The connecting portion 32 includes arm portions 32a protruding outward in the radial direction from both ends of the annular portion 31, and a first crosspiece member 32b disposed between leading ends of the arm portions 32a. The first crosspiece member 32b has a linear shape and is arranged at an outer side of the tail portion 12b of the terminal cover 12 in the radial direction, and is not in contact with the tail portion 12b.

Figure 10A:
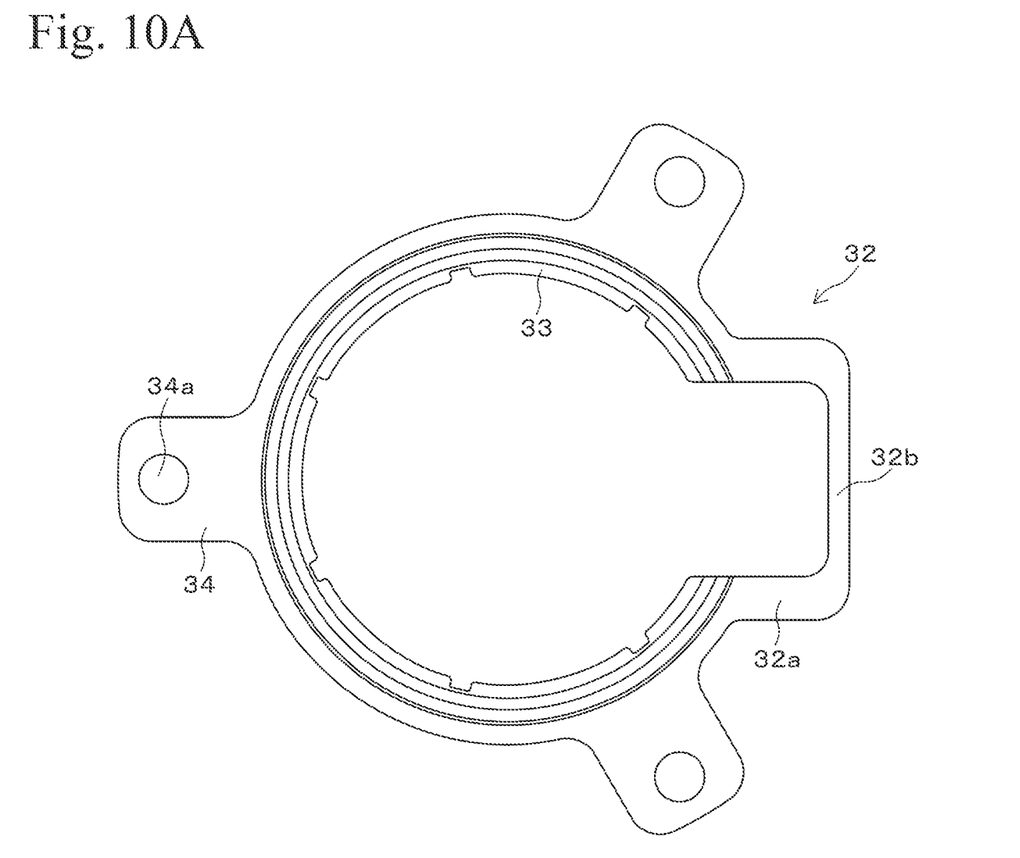
FIG. 10A is a plan view of the mounting member.
Figure 10B:
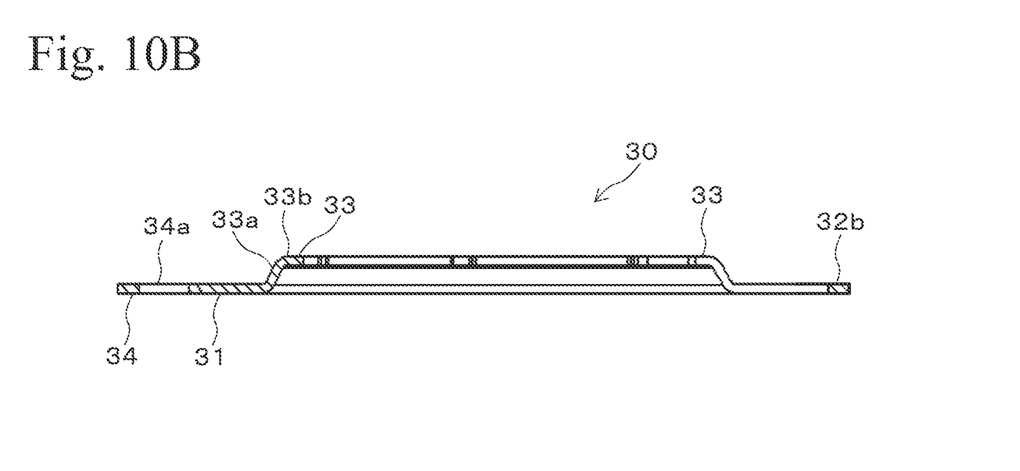
FIG. 10B is a side cross-sectional view of the mounting member.

A bent portion 33 shifted upward in the axial direction is formed at an inner circumferential edge portion of the annular portion 31. The bent portion 33 is equivalent in configuration to the bent portion 23 illustrated in FIG. 6, and includes a tapered portion 33a rising from the annular portion 31 in a tapered shape and a planar portion 33b parallel to the annular portion 31 as illustrated in FIG. 10B. A plurality of (three in this example) flange portions 34 protruding outward in the radial direction are formed at the outer circumferential edge of the annular portion 31 at equal intervals in the circumferential direction. Bolt insertion holes 34a for inserting the bolts 14 (see FIG. 3) are formed at the flange portions 34. The flange portions 34, the annular portion 31, and the connecting portion 32 are formed on a substantially identical plane.

The mounting bracket 30 is used to mount the stator 3 to the housing 5 in a method equivalent to the method in the first embodiment. In the structure for mounting a stator of a resolver described above, not only the actions and effects as in the first embodiment can be obtained as a matter of course, but also the configuration of the connecting portion 32 of the mounting bracket 30 is simple and the manufacturing cost can be reduced. In addition, the second embodiment has the following advantages over the first embodiment.

The stator of the VR-type resolver attached with the mounting bracket 20 according to the first embodiment illustrated in FIG. 1 is assembled in the working steps below.
a. The stator winding 8a is wound around the teeth 8 of the stator core 6, and the winding end 8b of the stator winding 8a is connected by tying to and is electrically connected, for example, by TIG welding to one end of the terminal pin 11.

b. After varnish is applied to a predetermined place of the stator winding 8a (a place up to the winding end 8b), the varnish is cured by being heated in an oven, for example.

c. After the varnish is cured, the lead wire 13 is welded to the other end of the terminal pin 11 by resistance welding.

d. The terminal cover 12 is attached to the terminal block 10.

e. The mounting bracket 20 is attached to the outer circumferential surface of the stator core 6, thermosetting adhesive is applied to a predetermined place of the mounting bracket 20, and then the adhesive is cured by being heated in an oven, for example.

As described above, in the first embodiment, two heating operations using an oven are required to cure the varnish and the adhesive. In this regard, in the second embodiment, if the mounting bracket 30 is attached to the outer circumferential surface of the stator core 6 before the application of the varnish, the application of the varnish and the application of the adhesive can be performed substantially at the same time so that the varnish and the adhesive can be cured by one heating operation in the oven.

[3] Third Embodiment

Figure 11:
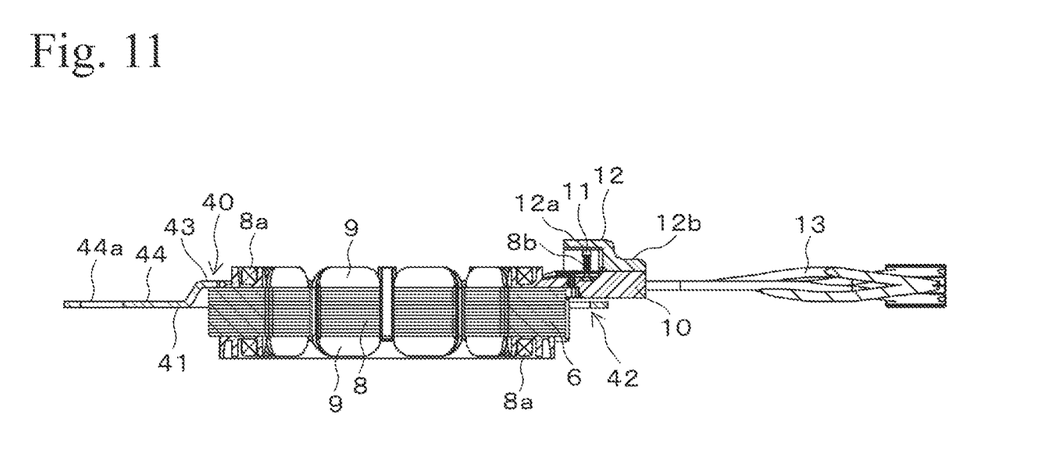
FIG. 11 is a cross-sectional view illustrating a state of a mounting member attached to a stator of a VR-type resolver according to a third embodiment of the disclosure.
Figure 12A:
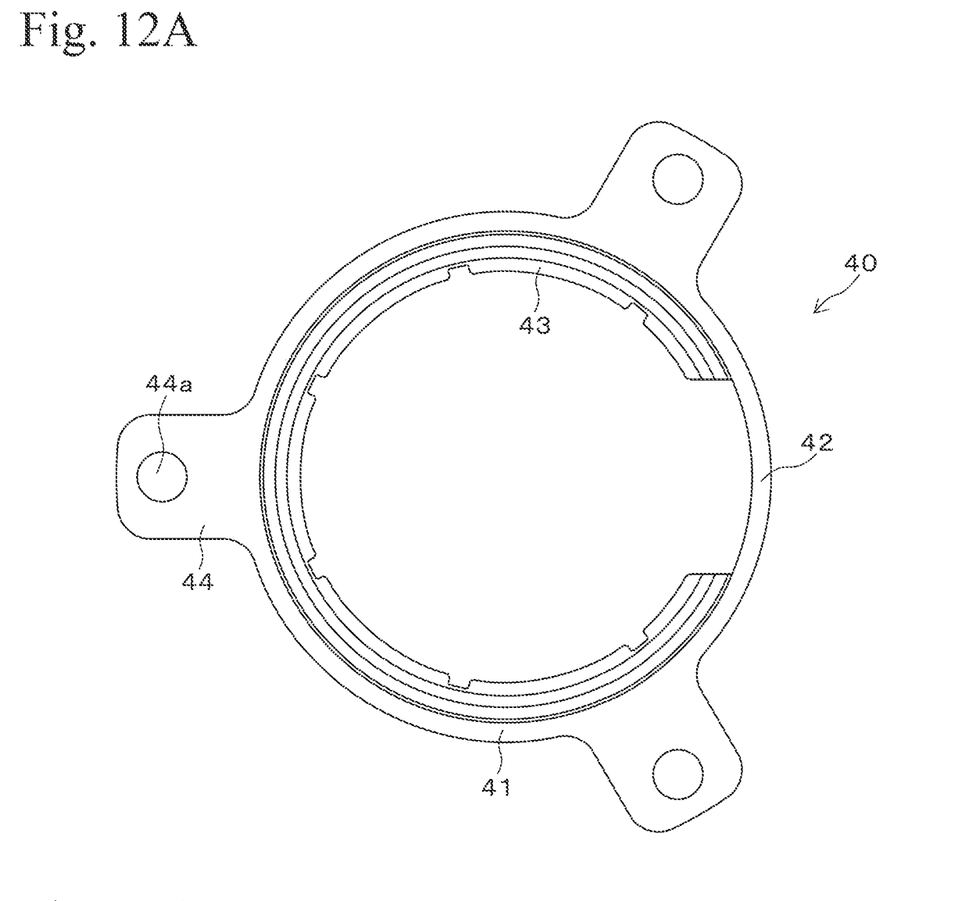
FIG. 12A is a plan view illustrating the mounting member illustrated in FIG. 11.
Figure 12B:
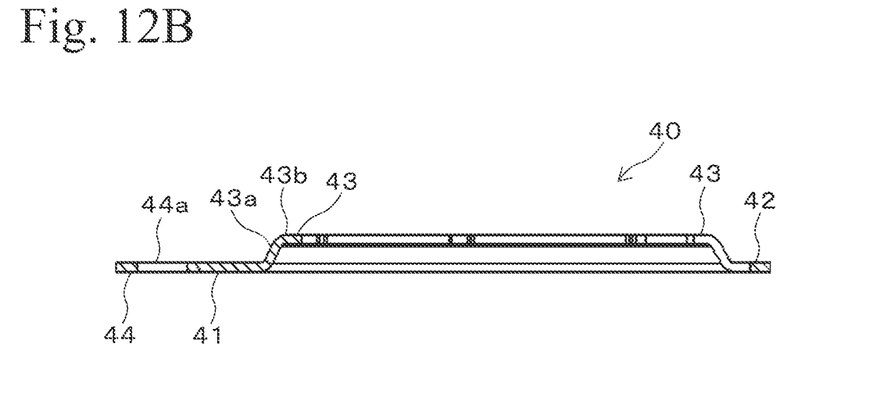
FIG. 12B is a side cross-sectional view of the mounting member.

FIG. 11, FIG. 12A, and FIG. 12B are diagrams illustrating a third embodiment of the disclosure.

A mounting bracket (mounting member) 40 includes an annular portion 41 having a substantially C-shape, and a connecting portion (second crosspiece member) 42 disposed between both ends of the annular portion 41. The connecting portion 42 extends from both ends of the annular portion 41 along an extension of a trajectory of a flat outer circumferential edge portion of the annular portion 41 with the same width and curvature as the flat outer circumferential edge portion of the annular portion 41. The connecting portion 42 is arranged below the terminal block 10 in the axial direction and is not in contact with the terminal block 10. That is, the connecting portion 42 constitutes a relief portion of the disclosure. Note that the connecting portion 42 may be of a linear shape.

A bent portion 43 shifted upward in the axial direction is formed at an inner circumferential edge portion of the annular portion 41. The bent portion 43 is equivalent in configuration to the bent portion 23 illustrated in FIG. 6, and includes a tapered portion 43a rising from the annular portion 41 in a tapered shape and a planar portion 43b parallel to the annular portion 41 as illustrated in FIG. 12B. A plurality of (three in this example) flange portions 44 protruding outward in the radial direction are formed at the outer circumferential edge of the annular portion 41 at equal intervals in the circumferential direction. Bolt insertion holes 44a for inserting the bolts 14 (see FIG. 3) are formed at the flange portions 44. The flange portion 44, the annular portion 41, and the connecting portion 42 are formed on a substantially identical plane.

The mounting bracket 40 is used to mount the stator 3 to the housing 5 in a method equivalent to the method in the first embodiment. In the structure for mounting a stator of a resolver described above, the actions and effects as in the second embodiment can be obtained as a matter of course. Further, since the profile of the outer circumference of the connecting portion 42 coincides with the profile of the outer circumference of the annular portion 41, the configuration of a stamping die for forming the mounting bracket 40 can be simplified and the material cost for the mounting bracket 40 can be reduced.

INDUSTRIAL APPLICABILITY

The disclosure can be used in a structure for fixing a resolver at a housing or the like.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A structure for mounting a stator of a resolver, the structure being for mounting the stator of the resolver at an opening of a housing, wherein
   the stator includes:
   a stator core,
   a stator winding wound via an insulator provided at the stator core, and
   a terminal block disposed at an outer side of the stator core in a radial direction,
   the stator core includes an end portion at one side in an axial direction, the end portion protruding from the opening of the housing in the axial direction, and is mounted to the housing by a mounting member being in contact with an end face of the end portion,
   the mounting member includes:
   an annular portion extending in a range excluding a part of an entire circumference,
   a connecting portion disposed between both ends of the annular portion, and
   a bent portion protruding toward the one side in the axial direction at an inner circumferential edge portion of the annular portion,
   the bent portion is in contact with the end face of the stator core, and
   the connecting portion includes a relief portion extending at a position away from the terminal block.

2. The structure for mounting a stator of a resolver according to claim 1, wherein
   the relief portion is bent at vicinities of both ends of the annular portion and located at the one side of the terminal block in the axial direction.

3. The structure for mounting a stator of a resolver according to claim 1, wherein
   the relief portion includes:
   arm portions extending outward in a radial direction from vicinities of both ends of the annular portion, and
   a first crosspiece member disposed between leading ends of the arm portions, and
   the first crosspiece member is located at an outer side of the terminal block in the radial direction.

4. The structure for mounting a stator of a resolver according to claim 3, wherein
   the mounting member includes a plurality of flange portions protruding outward in the radial direction from an outer circumferential edge of the annular portion, and
   the annular portion, the plurality of flange portions, and the connecting portion are formed on a substantially identical plane.

5. The structure for mounting a stator of a resolver according to claim 1, wherein
   the relief portion is a second crosspiece member disposed between both ends of the annular portion, and the second crosspiece member is located at another side of the terminal block in the axial direction.

6. The structure for mounting a stator of a resolver according to claim 5, wherein
the second crosspiece member extends along an extension of a trajectory of a flat outer circumferential edge portion of the annular portion with a width and a curvature identical to a width and a curvature of the flat outer circumferential edge portion.

7. The structure for mounting a stator of a resolver according to claim 5, wherein
the second crosspiece member has a linear shape.

8. The structure for mounting a stator of a resolver according to claim 1, wherein
the flange portions include a bolt insertion hole.

9. The structure for mounting a stator of a resolver according to claim 1, wherein
the connecting portion includes arm portions protruding outward in the radial direction from both ends of the annular portion, and
the relief portion is bent to the one side in the axial direction at end portions of the arm portions to form a gate shape.

10. The structure for mounting a stator of a resolver according to claim 1, wherein
the terminal block includes a plurality of terminal pins configured to be connected to an end of the stator winding by tying, and
a terminal cover protecting the terminal pins is attached to the terminal block.

* * * * *